United States Patent
Bowman

(10) Patent No.: US 10,278,381 B2
(45) Date of Patent: May 7, 2019

(54) MOUNTING FRAME FOR BIRD SPIKE STRIPS

(71) Applicant: Matthew Eric Bowman, Salcha, AK (US)

(72) Inventor: Matthew Eric Bowman, Salcha, AK (US)

( * ) Notice: Subject to any disclaimer, the term of this patent is extended or adjusted under 35 U.S.C. 154(b) by 0 days.

(21) Appl. No.: 16/017,699

(22) Filed: Jun. 25, 2018

(65) Prior Publication Data
US 2018/0368390 A1   Dec. 27, 2018

Related U.S. Application Data

(60) Provisional application No. 62/524,005, filed on Jun. 23, 2017.

(51) Int. Cl.
*A01M 29/30* (2011.01)
*A01M 29/32* (2011.01)

(52) U.S. Cl.
CPC .................... *A01M 29/32* (2013.01)

(58) Field of Classification Search
CPC .......... A01M 29/32; A01M 99/00; E04B 1/72
See application file for complete search history.

(56) References Cited

U.S. PATENT DOCUMENTS

| | | | | |
|---|---|---|---|---|
| 2,258,803 A * | 10/1941 | Peles | ..................... | A01M 29/32 256/11 |
| 5,606,830 A * | 3/1997 | Townsend, Jr. | ....... | A01M 29/32 256/11 |
| 6,546,676 B2 * | 4/2003 | Wiesener | .............. | A01M 29/32 119/52.3 |
| 7,040,058 B2 * | 5/2006 | Finkelstein | ........... | A01M 29/32 52/101 |
| 8,434,274 B2 * | 5/2013 | Anderson, Jr. | ....... | H01Q 1/1242 119/903 |
| 2004/0216393 A1 * | 11/2004 | Hall | ...................... | A01M 29/32 52/79.1 |
| 2010/0251633 A1 * | 10/2010 | Sabine | .................. | A01M 29/32 52/101 |
| 2013/0042544 A1 * | 2/2013 | Sabine | .................. | A01M 29/32 52/101 |
| 2014/0059948 A1 * | 3/2014 | Myers | ................... | A01M 29/30 52/101 |

* cited by examiner

*Primary Examiner* — Beth A Stephan

(57) ABSTRACT

A mounting frame for bird spike strips is an apparatus that is used to support a set of bird spike strips upon a billboard, sign, stand, or other structure upon which various birds would otherwise rest. The apparatus includes a first mounting rail, a second mounting rail, a first support bracket, a second support bracket, a spike attachment mechanism, and an anchoring mechanism. The first mounting rail and the second mounting rail are utilized to provide a stable mounting surface for bird spike strips. The first support bracket and the second support bracket enable connection of the first mounting rail and the second mounting rail to a billboard, sign, stand, or other structure. The spike attachment mechanism ensures that the previous problem of the traditional adhesive on bird spike strips fading or providing insufficient connection to billboards, signs, stands, or other structures. The anchoring mechanism ensures the first support bracket and the second support bracket connect securely to the billboard, sign, stand, or other structure.

14 Claims, 6 Drawing Sheets

MOUNTING FRAME FOR BIRD SPIKE STRIPS

The current application claims a priority to the U.S. Provisional Patent application Ser. No. 62/524,005 filed on Jun. 23, 2017. The current application is filed on Jun. 25, 2018 while Jun. 23, 2018 was on a weekend.

FIELD OF THE INVENTION

The present invention generally relates to a mounting tool. More specifically, the present mounting frame for bird spike strips relates to a mechanism for supporting bird spike strips, particularly for use in airports. The present invention prevents bird spike strips from falling from their generally mounted positions onto the ground, or from getting swept up into the engines or turbines of an airplane.

BACKGROUND OF THE INVENTION

Bird spikes are devices used to prevent birds and other flying objects from landing on a desired surface. Bird spike strips are elongated objects with a plurality of spikes protruding along the devices length. Presently, bird spike strips are often attached to the top of airport signs and other signs with an adhesive, which breaks down in poor weather conditions. This is problematic because bird spike strips equipped with insufficient adhesive result in an increase in the likelihood of producing foreign object damage. This is particularly hazardous in airport settings, as airplane engines can suck in the bird spike strips. In addition, the use of adhesives may prevent necessary maintenance to the signs, which requires the strips to be removed and subsequently replaced.

It is therefore an objective of the present invention to introduce a mounting frame for bird spike strips. The present invention provides a means to mechanically fasten bird spike strips to a frame. The frame easily mounts onto the top of an airport sign or similar device with a flat mounting surface. Due to the height of the frame, the bird spikes will be elevated a short distance above the mounting surface, with enough clearance for any additional hardware that may exist or be attached later on. In addition, this clearance allows for snow and debris to be swept off the top of the mounting surface and provide access to bolts used for attachment and removal of the frame when maintenance is required. Overall, the present invention is sturdy, simple, easy to use, safe, and effective.

DETAILED DESCRIPTION OF THE INVENTION

All illustrations of the drawings are for the purpose of describing selected versions of the present invention and are not intended to limit the scope of the present invention.

Figure 1:
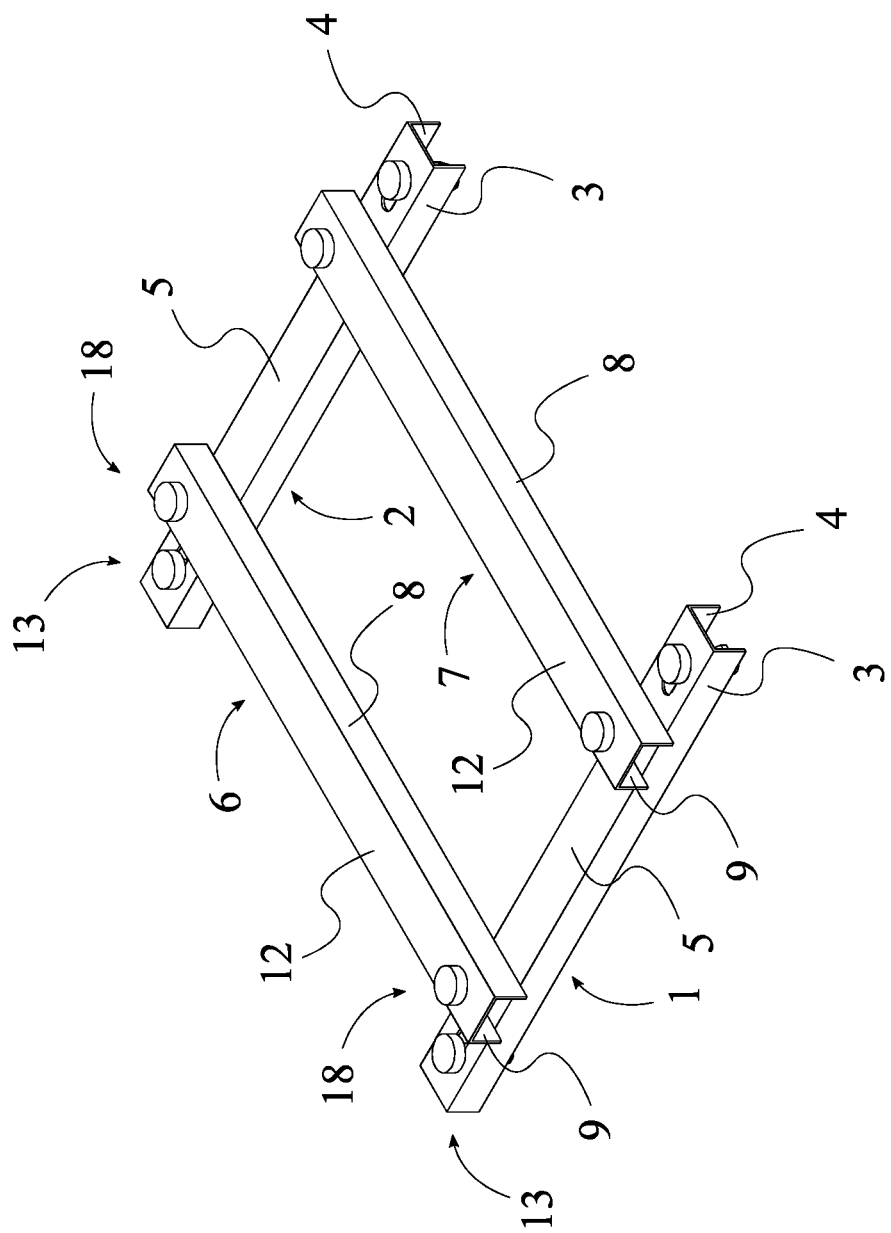
FIG. 1 is a front-right perspective view of the present invention.
Figure 2:
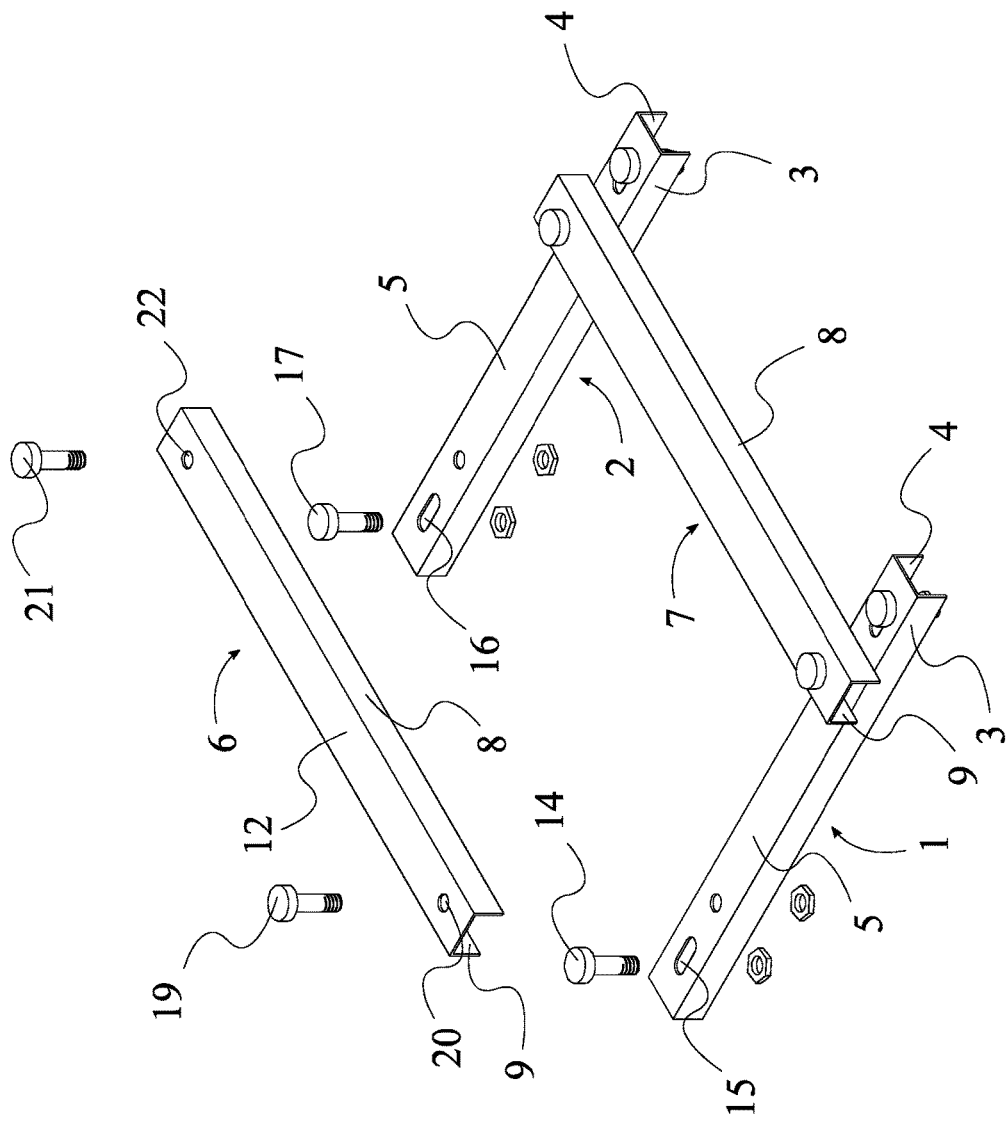
FIG. 2 is a front-right perspective view of the present invention with the first mounting rail in an exploded configuration

The present invention is a mounting frame for bird spike strips that allows a user to arrange and support bird spike strips commonly used to prevent birds from landing on signage and top edges of structures. The present invention supports bird spike strips using fasteners, thus preventing the common problem of bird spike strips falling off due to minimal connection from adhesives. The present invention comprises a first mounting rail 6, a second mounting rail 7, a first support bracket 1, a second support bracket 2, an anchoring mechanism 13, and a spike attachment mechanism 18, as seen in FIG. 1. The first mounting rail 6 is a structural unit that enables connection of a bird spike strip. The second mounting rail 7 is a structural unit that enables connection of a bird spike strip. The first mounting rail 6 and the second mounting rail 7 together allow coverage of a full range of coverage over signage and top edges of structures. The first support bracket 1 is a structural unit that supports the first mounting rail 6 and the second mounting rail 7 and connects the first mounting rail 6 and the second mounting rail 7 to signage and the top edges of structures. The second support bracket 2 is a structural unit that supports the first mounting rail 6 and the second mounting rail 7 and connects the first mounting rail 6 and the second mounting rail 7 to signage and the top edges of structures. The anchoring mechanism 13 is a series of cuts and fasteners that joins the first support bracket 1 and the second support bracket 2 to signage or the top edges of structures and joins the first mounting rail 6 and the second mounting rail 7 to the first support bracket 1 and the second support bracket 2. The spike attachment mechanism 18 is a series of cuts and fasteners that enables secure connection of bird spike strips to the first mounting rail 6 and the second mounting rail 7.

Figure 3:
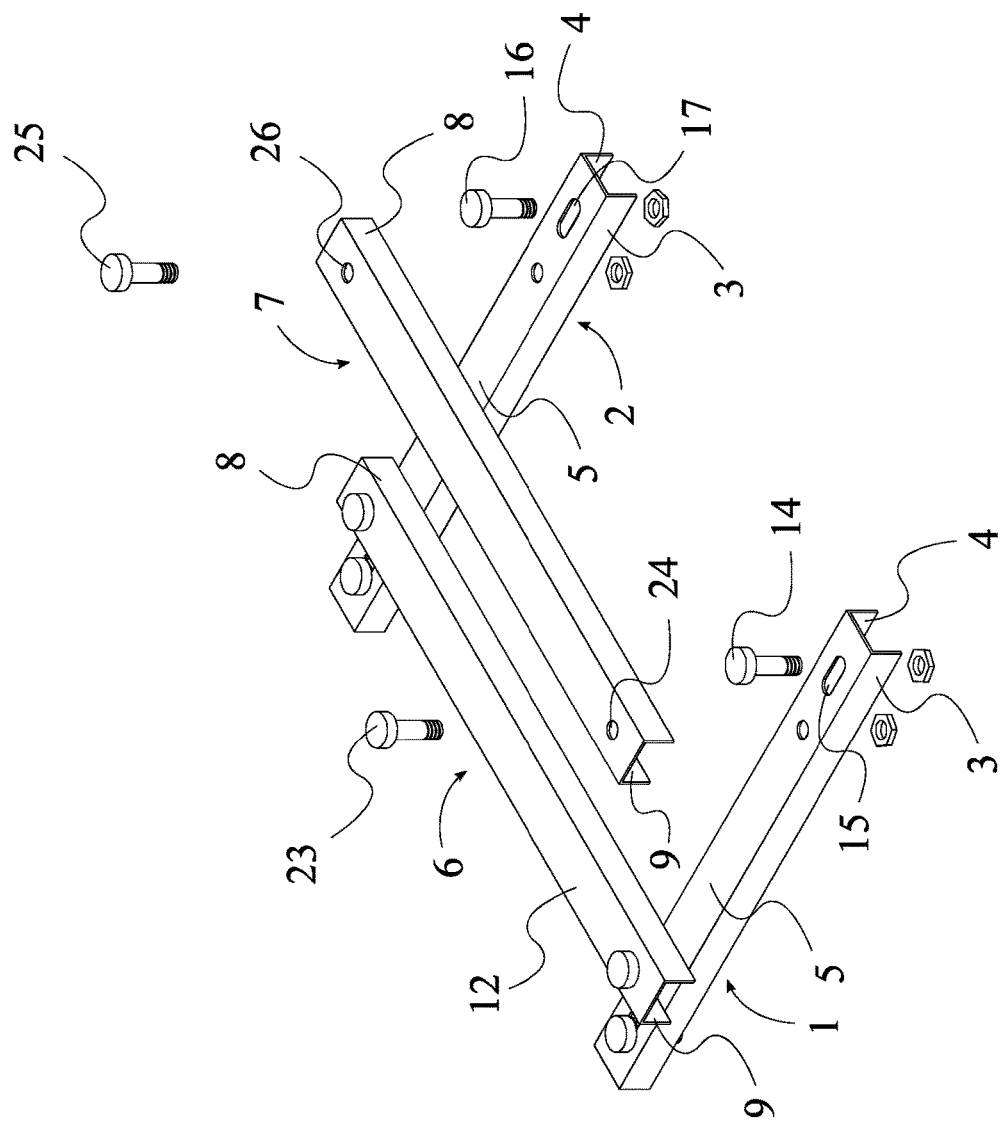
FIG. 3 is a front-right perspective view of the present invention with the second mounting rail in an exploded configuration

The general configuration of the aforementioned components allows the present invention to efficiently and effectively mount bird spike strips onto structures that birds may perch on. The first mounting rail 6 and the second mounting rail 7 are positioned parallel and offset from each other, as seen in FIG. 3. This ensures full coverage of a desired area and simultaneously prevents mounted spikes from entangling with each other. The first mounting rail 6 and the second mounting rail 7 are mounted atop the first support bracket 1 and the second support bracket 2, thus allowing secure connection of the first mounting rail 6 and the second mounting rail 7 to a structure. The first support bracket 1 and the second support bracket 2 are positioned opposite to each other along the first mounting rail 6 and the second mounting rail 7, thus ensuring that the first mounting rail 6 and the second mounting rail 7 are held securely in place. The anchoring mechanism 13 is integrated into the first support bracket 1 and the second support bracket 2, allowing the first support bracket 1 and the second support bracket 2 to secure to a variety of signs, advertisements, and other surfaces. The spike attachment mechanism 18 is integrated into the first mounting rail 6 and the second mounting rail 7, preventing spike strips from falling off the first mounting rail 6 and the second mounting rail 7.

In an exemplary embodiment, the first support bracket 1 and the second support bracket 2 are an elongated body, allowing for relative positioning of the first mounting rail 6 and the second mounting rail 7. The first support bracket 1 is positioned perpendicular to the first mounting rail 6 and the second mounting rail 7, and the second support bracket 2 is also positioned perpendicular to the first mounting rail 6 and the second mounting rail 7. This arrangement allows the present invention to evenly distribute the weight of the mounted bird spikes onto four separate points on the first support bracket 1 and the second support bracket 2.

Figure 4:
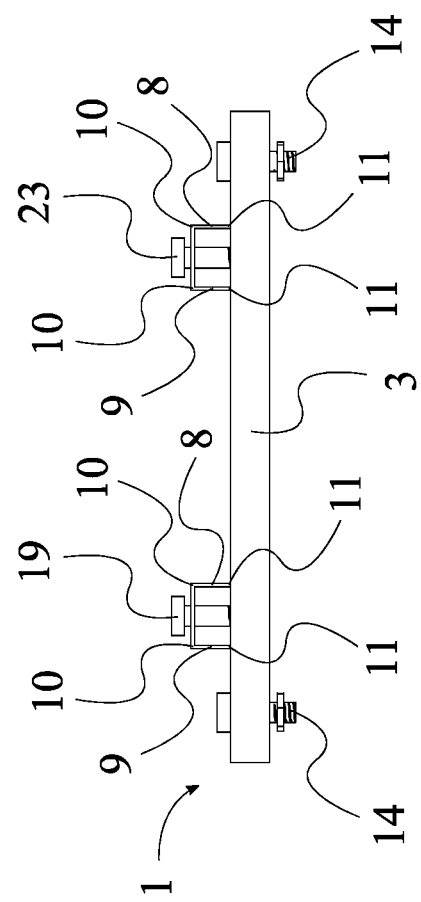
FIG. 4 is a right side view of the present invention.

In order to improve the structural integrity of the first support bracket 1, the first support bracket 1 comprises a first leg 3, a second leg 4, and a web 5, as seen in FIG. 4. The first leg 3, second leg 4, and web 5 are arranged to form a channel that prevents the first support bracket 1 from bending under its own weight or under the weight of the first mounting rail 6 or the second mounting rail 7. The first leg 3 is connected perpendicular and adjacent to the web 5, supporting the web 5 opposite the second leg 4. Similarly, the second leg 4 is connected perpendicular and adjacent to the web 5, supporting the web 5 opposite the first leg 3. The first leg 3 and the second leg 4 together provide structural support, thus maintaining the unbent shape of the web 5 for convenient addition of the first mounting rail 6 and the second mounting rail 7. Furthermore, the anchoring mechanism 13 comprises a plurality of first fasteners 14 and a plurality of first slots 15. The plurality of first slots 15 traverses through the web 5, is distributed on the web 5, and is positioned collinearly to each other. This arrangement allows for a fastener to be attached at any point along the web 5. Each of the plurality of first fasteners 14 is engaged through a corresponding slot from the plurality of first slots 15. This allows the plurality of first fasteners 14 to secure the first support bracket 1 in place against signage and other structures.

In order to improve the structural integrity of the second support bracket 2, the second support bracket 2 comprises a first leg 3, a second leg 4, and a web 5, as seen in FIG. 3. The first leg 3, second leg 4, and web 5 are arranged to form a channel that prevents the second support bracket 2 from bending under its own weight or under the weight of the first mounting rail 6 or the second mounting rail 7. The first leg 3 is connected perpendicular and adjacent to the web 5, supporting the web 5 opposite the second leg 4. Similarly, the second leg 4 is connected perpendicular and adjacent to the web 5, supporting the web 5 opposite the first leg 3. The first leg 3 and the second leg 4 together provide structural support, thus maintaining the unbent shape of the web 5 for convenient addition of the first mounting rail 6 and the second mounting rail 7. Furthermore, the anchoring mechanism 13 comprises a plurality of second fasteners 16 and a plurality of second slots 17. The plurality of second slots 17 traverses through the web 5, is distributed on the web 5, and is positioned collinearly to each other. This arrangement allows for a fastener to be attached at any point along the web 5. Each of the plurality of second fasteners 16 is engaged through a corresponding slot from the plurality of second slots 17. This allows the plurality of second fasteners 16 to secure the second support bracket 2 in place against signage and other structures.

Figure 5:
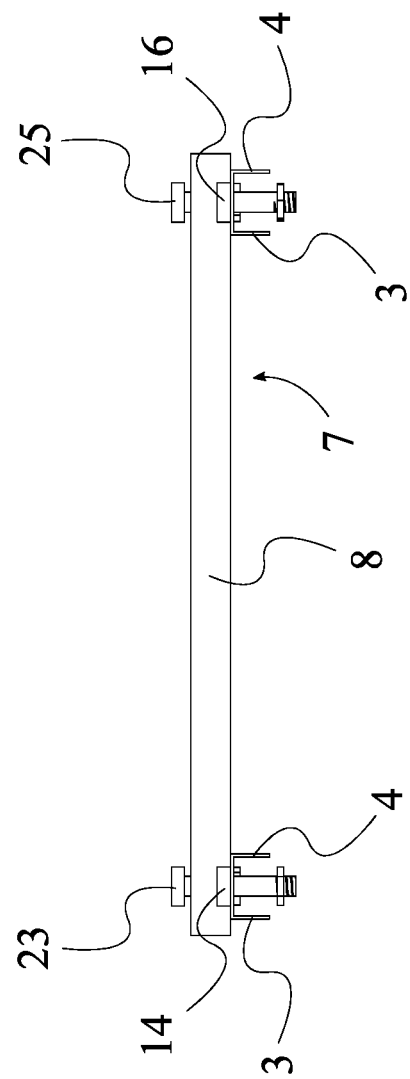
FIG. 5 is a front side view of the present invention.

In order to improve upon the structural integrity of the first mounting rail 6, the first mounting rail 6 comprises a first leg 8, a second leg 9, and a web 12, as seen in FIG. 5. The first leg 8, second leg 9, and web 12 are arranged to form a channel, which improves the structural strength of the first mounting rail 6, preventing the first mounting rail 6 from bending under its own weight or under the weight of a bird spike strip. The first leg 8 is connected perpendicular and adjacent to the web 12, supporting the web 12 opposite the second leg 9. Similarly, the second leg 9 is connected perpendicular and adjacent to the web 12, supporting the web 12 opposite the first leg 8. The first leg 8 and the second leg 9 together provide structural support, thus maintaining the unbent shape of the web 12 for convenient addition of a bird spike strip. Furthermore, the spike attachment mechanism 18 comprises a third fastener 19 and a third hole 20, which secure a bird spike strip in place while simultaneously securing the first mounting rail 6 in place relative to the first support bracket 1. The third hole 20 traverses through the web 12 and is positioned adjacent to the first support bracket 1. The third fastener 19 is engaged through the third hole 20 and fixed onto the first support bracket 1. The third fastener 19 may include screws, bolts, washers, nuts, or other similar securing mechanisms. This arrangement of the third fastener 19 and the third hole 20 allows for secure connection of the first mounting rail 6 to the first support bracket 1, and for securing a bird spike strip to the first mounting rail 6.

The spike attachment mechanism 18 further comprises a fourth fastener 21 and a fourth hole 22, which secure a bird spike strip in place while simultaneously securing the first mounting rail 6 in place relative to the second support bracket 2. The fourth hole 22 traverses through the web 12 and is positioned adjacent to the second support bracket 2. The fourth fastener 21 is engaged through the fourth hole 22 and fixed onto the second support bracket 2. The fourth fastener 21 may include screws, bolts, washers, nuts, or other similar securing mechanisms. This arrangement of the fourth fastener 21 and the fourth hole 22 allows for secure connection of the first mounting rail 6 to the second support bracket 2, and for securing a bird spike strip to the first mounting rail 6. The first leg 8 and the second leg 9 each comprise a proximal end 10 and a distal end 11. The proximal end 10 is connected adjacent to the web 12. This allows pressure exerted onto the web 12 to transfer to the first leg 8 and the second leg 9. The distal end 11 is pressed against the first support bracket 1 and the second support bracket 2. This allows the first leg 8 and the second leg 9 to transfer pressure from the proximal end 10 through to the first support bracket 1 and the second support bracket 2.

In order to improve upon the structural integrity of the second mounting rail 7, the second mounting rail 7 comprises a first leg 8, a second leg 9, and a web 12. The first leg 8, second leg 9, and web 12 are arranged to form a channel that prevents the second mounting rail 7 from bending under its own weight or under the weight of a bird spike strip. The first leg 8 is connected perpendicular and adjacent to the web 12, supporting the web 12 opposite the second leg 9. Similarly, the second leg 9 is connected perpendicular and adjacent to the web 12, supporting the web 12 opposite the first leg 8. The first leg 8 and the second leg 9 together provide structural support, thus maintaining the unbent shape of the web 12 for convenient addition of a bird spike strip. Furthermore, the spike attachment mechanism 18 comprises a fifth fastener 23 and a fifth hole 24, which secure a bird spike strip in place while simultaneously securing the second mounting rail 7 in place relative to the first support bracket 1. The fifth hole 24 traverses through the web 12 and is positioned adjacent to the first support bracket 1. The fifth fastener 23 is engaged through the fifth hole 24 and fixed onto the first support bracket 1. The fifth fastener 23 may include screws, bolts, washers, nuts, or other similar securing mechanisms. This arrangement of the fifth fastener 23 and the fifth hole 24 allows for secure connection of the second mounting rail 7 to the first support bracket 1, and for securing a bird spike strip to the second mounting rail 7.

Figure 6:
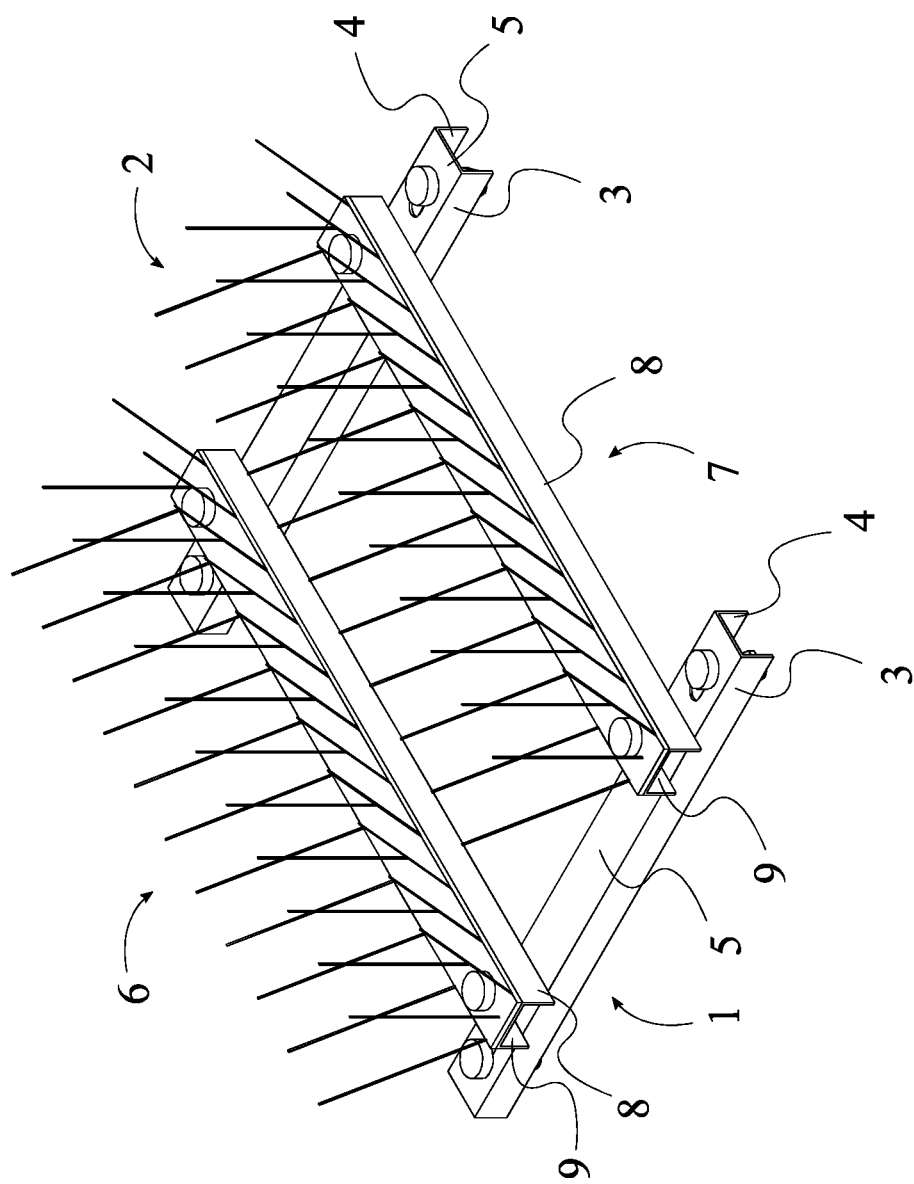
FIG. 6 is a front-right perspective view of the present invention with bird spike strips attached.

The spike attachment mechanism 18 further comprises a sixth fastener 25 and a sixth hole 26, which secure a bird spike strip in place while simultaneously securing the second mounting rail 7 in place relative to the second support bracket 2, as seen in FIG. 6. The sixth hole 26 traverses through the web and is positioned adjacent to the second support bracket 2. The sixth fastener 25 is engaged through the sixth hole 26 and fixed onto the second support bracket 2. The sixth fastener 25 may include screws, bolts, washers, nuts, or other similar securing mechanisms. This arrangement of the sixth fastener 25 and the sixth hole 26 allows for secure connection of the second mounting rail 7 to the second support bracket 2, and for securing a bird spike strip to the second mounting rail 7. The first leg 8 comprises a proximal end 10 and a distal end 11. The proximal end 10 is connected adjacent to the web 12. This allows pressure exerted onto the web 12 to transfer to the first leg 8. The distal end 11 is pressed against the first support bracket 1 and the second support bracket 2. This allows the first leg 8 to transfer pressure from the proximal end 10 through to the first support bracket 1 and the second support bracket 2. The second leg 9 comprises a proximal end 10 and a distal end 11. The proximal end 10 is connected adjacent to the web 12. This allows pressure exerted onto the web 12 to transfer to the second leg 9, in conjunction with the first leg 8. The distal end 11 is pressed against the first support bracket 1 and the second support bracket 2. This allows the second leg 9 to transfer pressure from the proximal end 10 through to the first support bracket 1 and the second support bracket 2, in conjunction with the first leg 8.

Although the invention has been explained in relation to its preferred embodiment, it is to be understood that many other possible modifications and variations can be made without departing from the spirit and scope of the invention as hereinafter claimed.

The invention claimed is:

1. A mounting frame for bird spike strips comprising:
   a first mounting rail;
   a second mounting rail;
   a first support bracket;
   a second support bracket;
   an anchoring mechanism;
   a spike attachment mechanism;
   the first mounting rail and the second mounting rail being positioned parallel and offset from each other;
   the first mounting rail and the second mounting rail being mounted onto the first support bracket and the second support bracket;
   the first support bracket and the second support bracket being positioned opposite to each other along the first mounting rail and the second mounting rail;
   the anchoring mechanism being integrated into the first support bracket and the second support bracket;
   the spike attachment mechanism being integrated into the first mounting rail and the second mounting rail;
   the first support bracket comprising a first leg, a second leg and a web;
   the first leg of the first support bracket being connected perpendicular and adjacent to the web of the first support bracket;
   the second leg of the first support bracket being connected perpendicular and adjacent to the web of the first support bracket, opposite the first leg of the first support bracket;
   the anchoring mechanism comprising a plurality of first fasteners and a plurality of first slots;
   the plurality of first slots traversing through the web of the first support bracket;
   the plurality of first slots being distributed along the web of the first support bracket;
   the plurality of first slots being positioned collinear to each other; and
   each of the plurality of first fasteners being engaged through a corresponding slot from the plurality of first slots.

2. The mounting frame for bird spike strips as claimed in claim 1 comprising:
   the first support bracket and the second support bracket being an elongated body;
   the first support bracket being positioned perpendicular to the first mounting rail and the second mounting rail; and
   the second support bracket being positioned perpendicular to the first mounting rail and the second mounting rail.

3. The mounting frame for bird spike strips as claimed in claim 1 comprising:
   the second support bracket comprising a first leg, a second leg and a web;
   the first leg of the second support bracket being connected perpendicular and adjacent to the web of the second support bracket; and
   the second leg of the second support bracket being connected perpendicular and adjacent to the web of the second support bracket, opposite the first leg of the second support bracket.

4. The mounting frame for bird spike strips as claimed in claim 3 comprising:
   the anchoring mechanism comprising a plurality of second fasteners and a plurality of second slots;
   the plurality of second slots traversing through the web of the second support bracket;
   the plurality of second slots being distributed along the web of the second support bracket;
   the plurality of second slots being positioned collinear to each other; and
   each of the plurality of second fasteners being engaged through a corresponding slot from the plurality of second slots.

5. The mounting frame for bird spike strips as claimed in claim 1 comprising:
   the first mounting rail comprising a first leg, a second leg and a web;
   the first leg of the first mounting rail being connected perpendicular and adjacent to the web of the first mounting rail; and
   the second leg of the first mounting rail being connected perpendicular and adjacent to the web of the first mounting rail, opposite the first leg of the first mounting rail.

6. The mounting frame for bird spike strips as claimed in claim 5 comprising:
   the spike attachment mechanism comprising a third fastener and a third hole;
   the third hole traversing through the web of the first mounting rail;
   the third hole being positioned adjacent to the first support bracket;
   the third fastener being engaged through the third hole; and
   the third fastener being fixed onto the first support bracket.

7. The mounting frame for bird spike strips as claimed in claim 5 comprising:
   the spike attachment mechanism comprising a fourth fastener and a fourth hole;
   the fourth hole traversing through the web of the first mounting rail;
   the fourth hole being positioned adjacent to the second support bracket;
   the fourth fastener being engaged through the fourth hole; and the fourth fastener being fixed onto the second support bracket.

8. The mounting frame for bird spike strips as claimed in claim 5 comprising:
the first leg of the first mounting rail comprising a proximal end and a distal end;
the proximal end being connected adjacent to the web of the first mounting rail; and
the distal end being pressed against the first mounting bracket and the second mounting bracket.

9. The mounting frame for bird spike strips as claimed in claim 5 comprising:
the second leg of the first mounting rail comprising a proximal end and a distal end;
the proximal end being connected adjacent to the web of the first mounting rail; and
the distal end being pressed against the first mounting bracket and the second mounting bracket.

10. The mounting frame for bird spike strips as claimed in claim 1 comprising:
the second mounting rail comprising a first leg, a second leg and a web;
the first leg of the second mounting rail being connected perpendicular and adjacent to the web of the second mounting rail; and
the second leg of the second mounting rail being connected perpendicular and adjacent to the web of the second mounting rail, opposite the first leg of the second mounting rail.

11. The mounting frame for bird spike strips as claimed in claim 10 comprising:
the spike attachment mechanism comprising a fifth fastener and a fifth hole;
the fifth hole traversing through the web of the second mounting rail;
the fifth hole being positioned adjacent to the first support bracket;
the fifth fastener being engaged through the fifth hole; and
the fifth fastener being fixed onto the first support bracket.

12. The mounting frame for bird spike strips as claimed in claim 10 comprising:
the spike attachment mechanism comprising a sixth fastener and a sixth hole;
the sixth hole traversing through the web of the second mounting rail;
the sixth hole being positioned adjacent to the second support bracket;
the sixth fastener being engaged through the sixth hole; and
the sixth fastener being fixed onto the second support bracket.

13. The mounting frame for bird spike strips as claimed in claim 10 comprising:
the first leg of the second mounting rail comprising a proximal end and a distal end;
the proximal end being connected adjacent to the web of the second mounting rail; and
the distal end being pressed against the first mounting bracket and the second mounting bracket.

14. The mounting frame for bird spike strips as claimed in claim 10 comprising:
the second leg of the second mounting rail comprising a proximal end and a distal end;
the proximal end being connected adjacent to the web of the second mounting rail; and
the distal end being pressed against the first mounting bracket and the second mounting bracket.

* * * * *